United States Patent [19]
Lawson et al.

[11] Patent Number: 6,139,226
[45] Date of Patent: Oct. 31, 2000

[54] INJECTION METHOD FOR FEEDING PARTICULATE TO A PROCESS VESSEL

[75] Inventors: Kevin W. Lawson, Orange; Gary K. Scott, Beaumont; Wendell H. Snelson, Orange, all of Tex.

[73] Assignee: Chevon Chemical Company LLC, San Ramon, Calif.

[21] Appl. No.: 09/190,653

[22] Filed: Nov. 12, 1998

Related U.S. Application Data

[63] Continuation-in-part of application No. 08/862,105, May 22, 1997, Pat. No. 5,851,493.
[51] Int. Cl.[7] .................................................... B65G 53/46
[52] U.S. Cl. ........................... 406/131; 406/52; 406/124; 406/146
[58] Field of Search ................................. 406/28, 29, 52, 406/181, 183, 197, 131, 129

[56] References Cited

U.S. PATENT DOCUMENTS

| | | | |
|---|---|---|---|
| 3,489,178 | 1/1970 | Kice | 406/183 |
| 4,774,299 | 9/1988 | Dumain et al. | 526/64 |
| 5,556,238 | 9/1996 | Chinh | 406/136 |
| 5,752,788 | 5/1998 | Crum | 406/129 |

FOREIGN PATENT DOCUMENTS

| | | | |
|---|---|---|---|
| 8201537 | 5/1982 | WIPO | 406/52 |

*Primary Examiner*—Christopher P. Ellis
*Assistant Examiner*—Joe Dillon, Jr.
*Attorney, Agent, or Firm*—W. B. Haymond; J. W. Ambrosius; W. K. Turner

[57] ABSTRACT

An injection method for feeding a particulate material to a process vessel, including a valve with at least one cavity adapted for receipt of a predetermined volume of particulate and a sweep stream source for providing a sweep stream having flow in a direction generally toward the valve to remove substantially all of the particulate from the cavity of the valve.

2 Claims, 4 Drawing Sheets

INJECTION METHOD FOR FEEDING PARTICULATE TO A PROCESS VESSEL

CROSS-REFERENCE TO RELATED APPLICATIONS

This application is a Continuation-in-Part of U.S. application Ser. No. 08/862,105, filed May 22, 1997, now U.S. Pat. No. 5,851,493.

BACKGROUND OF THE INVENTION

1. Field of the Invention

The invention relates to an injection system for feeding a particulate material to a process vessel, which in a particular embodiment could include, for example, feeding consistent amounts of catalyst to a polyethylene reactor over an extended period of time.

2. Description of the Prior Art

Various systems have been proposed that provide catalysts or other particulates to a reactor, such as a polyethylene reactor, in measured quantities over an extended period of time. Such systems have included various combinations of valves and have utilized pressurized feed gas or sweep streams of inert gases to mobilize, or transport, the particulate from a particulate storage vessel to the reactor. Some systems repeatedly open and close a particulate feed valve to allow measured doses of the particulate to flow from the particulate storage vessel aided only by gravity directly to the reactor, or they may utilize an intermediate chamber in which to deposit the measured doses of particulate prior to flushing the particulate from the intermediate chamber by use of a feed gas or sweep stream. However, such prior systems have failed to adequately provide an efficient method of accurately and consistently providing the measured dose of particulate to the reactor.

Various valve designs have been utilize to improve the accuracy of the particulate dosage. For example, rotary valves have been utilized by replacing standard cylindrical or spherical rotors in rotary valve devices with modified rotors having a cup-shaped cavity formed therein for receiving the measured particulate dose. The rotor can then be rotated, or inverted, between a first, or filling, position for filling the cavity with particulate from the particulate storage vessel and a second, or releasing, position for releasing the particulate into the intermediate chamber. Such prior rotary valve devices may produce less than exact measured doses to the reactor because amounts of the particulates may remain inside the cup-shaped cavity after being rotated into the second, or releasing, position. Prior systems have attempted to minimize this problem and have included small ball bearings, or "chatter plates", into the bottom of the cavity, which are intended to mechanically clear any remaining particulates from the bottom of the cavity when rotated or inverted to the releasing position. Prior systems have proved to be costly, complicated, and difficult to maintain.

Prior systems have proved to be inadequate for providing precise, measured, doses of particulates to reactors over extended periods of time, and have proved to be complicated and difficult to maintain. Accordingly, prior to the development of the injection system of the present invention, there has been no injection system for feeding particulate to a reactor that provides efficient and consistent dosages of particulates to a reactor over an extended period of time, and which are simple, inexpensive to maintain, have very few moving parts, and minimize failure. Therefore, the art has sought an injection system for feeding particulate to a reactor that provides efficient and consistent dosages of particulates to a reactor over an extended period of time, and which are simple, inexpensive to maintain, have very few moving parts, and minimize failure.

Furthermore, the art has sought a means for eliminating concentrated clumps or "slugs" of particulate which when the particulate is a catalyst tend to result in local areas of high activity in the reactor and subsequent fouling.

SUMMARY OF THE INVENTION

In accordance with the invention, the foregoing advantages have been achieved through the present injection system for feeding particulate to a reactor, whereby efficient and effective dosages of particulate may be provided to a reactor over an extended period of time.

The present invention may be directed to an injection system for feeding a particulate material to a process vessel, comprising: a valve, having at least one cavity adapted for receipt of a predetermined volume of particulate, and a sweep stream source for providing a sweep stream having flow in a direction generally toward the valve to remove substantially all of the particulate from the cavity of the valve. The valve may be a rotary valve having a rotatably disposed rotor having a first position for receiving the predetermined volume of particulate and a second position for releasing the predetermined volume of particulate, and the rotor may have a drive mechanism disposed in engagement therewith for rotating the rotor between the first and second position.

The present invention may further be directed to an injection system for feeding a particulate material to a process vessel, comprising: a sweep stream source; a rotor housing having a rotor receiving chamber therein and a sweep chamber associated with the rotor housing; a rotor, rotatably disposed within the rotor receiving chamber of the rotor housing, the rotor having at least one cavity adapted for receipt of a predetermined volume of particulate, the rotor having a first position for receiving the predetermined volume of particulate and a second position for releasing the predetermined volume of particulate to the sweep chamber of the rotor housing, the rotor further having a drive mechanism disposed in engagement therewith for rotating the rotor between the first and second position; a sweep stream port disposed in fluid communication with the sweep chamber of the rotor housing for providing a sweep stream to the sweep chamber of the rotor housing, the sweep stream having flow in a direction generally toward the rotor to remove particulate from the rotor cavity and to transport particulate to the reactor.

The injection system may further comprise a sweep stream directed to a surface of the cavity of the rotor, and the cavity of the rotor may have an arcuate portion or may have an entirely arcuate shape. The injection system may further comprise a drive keyway, which may be formed in the rotor, and the drive mechanism may include a rotary actuator having a shaft disposed in the drive keyway of the rotor. The rotor may be spherical or it may be cylindrical. The particulate may be a catalyst but is not intended to be limited to a catalyst and the process vessel may be a polyethylene reactor but is not intended to be limited to a polyethylene reactor.

The present invention may further be directed toward a method of injecting particulate into a process vessel, comprising the steps of: providing a metering device disposed between a particulate storage vessel and a sweep chamber, the metering device having a rotor with a cavity formed therein, which cavity may include an arcuate portion or may have an entirely arcuate shape; providing a sweep stream directed generally towards the rotor; rotating the rotor to a first position for receiving a predetermined volume of particulate stored in the particulate storage vessel; and rotating the rotor to a second position for releasing the predetermined volume of particulate to the sweep chamber, whereby the sweep stream will flush any remaining particulate material, which may be within the cavity formed in the rotor. The sweep stream may assist in transporting the particulates to the reactor, and the rotor may be rotatably disposed within a rotor housing.

Furthermore, the sweep stream dilutes and disperses particulates flushed from the cavity so that the carrier gas is substantially free of concentrated clumps of the particulate material.

The injection system for feeding particulate to a reactor, when compared with previously proposed prior art injection systems for feeding particulate to a reactor, has the advantages of providing efficient and effective measured doses of particulates to a reactor over an extended period of time.

Figure 1:
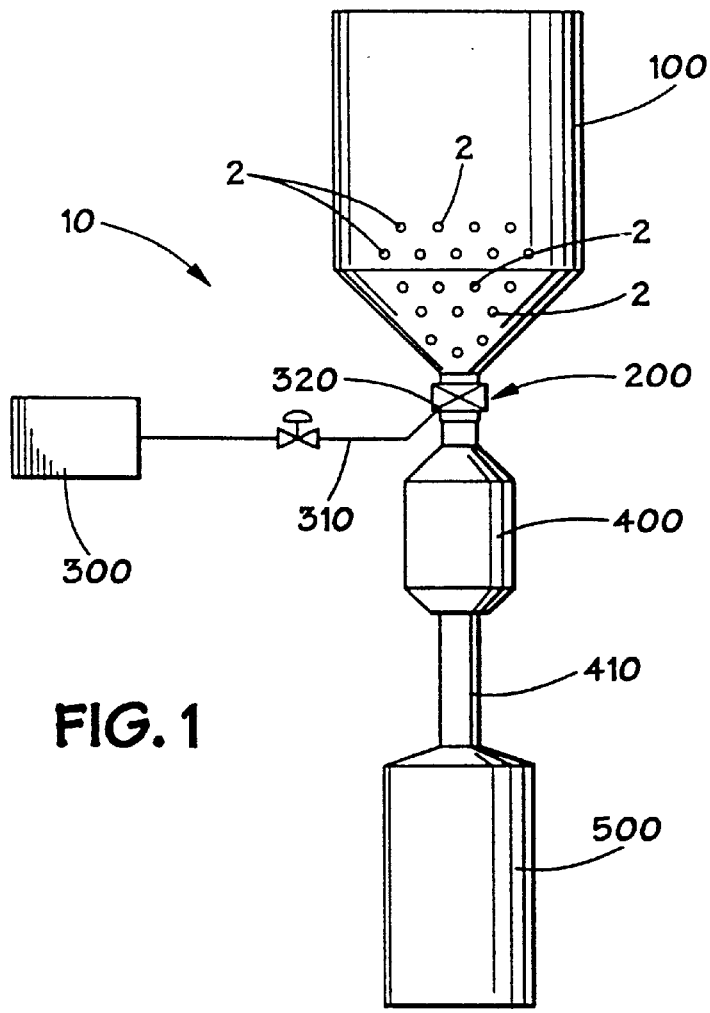
FIG. 1 is a schematic view of an embodiment of an injection system of the present invention.

While the invention may be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In a broad aspect, the present invention is directed to a method and apparatus for feeding particulate to a process vessel. The method may be carried out in connection with the apparatus, and/or the method may be carried out in connection with other apparatus. Likewise, the apparatus may be utilized in connection with other methods. Various embodiments and aspects of the apparatus are shown in FIGS. 1–4, where like reference numerals refer to like parts.

Figure 2:
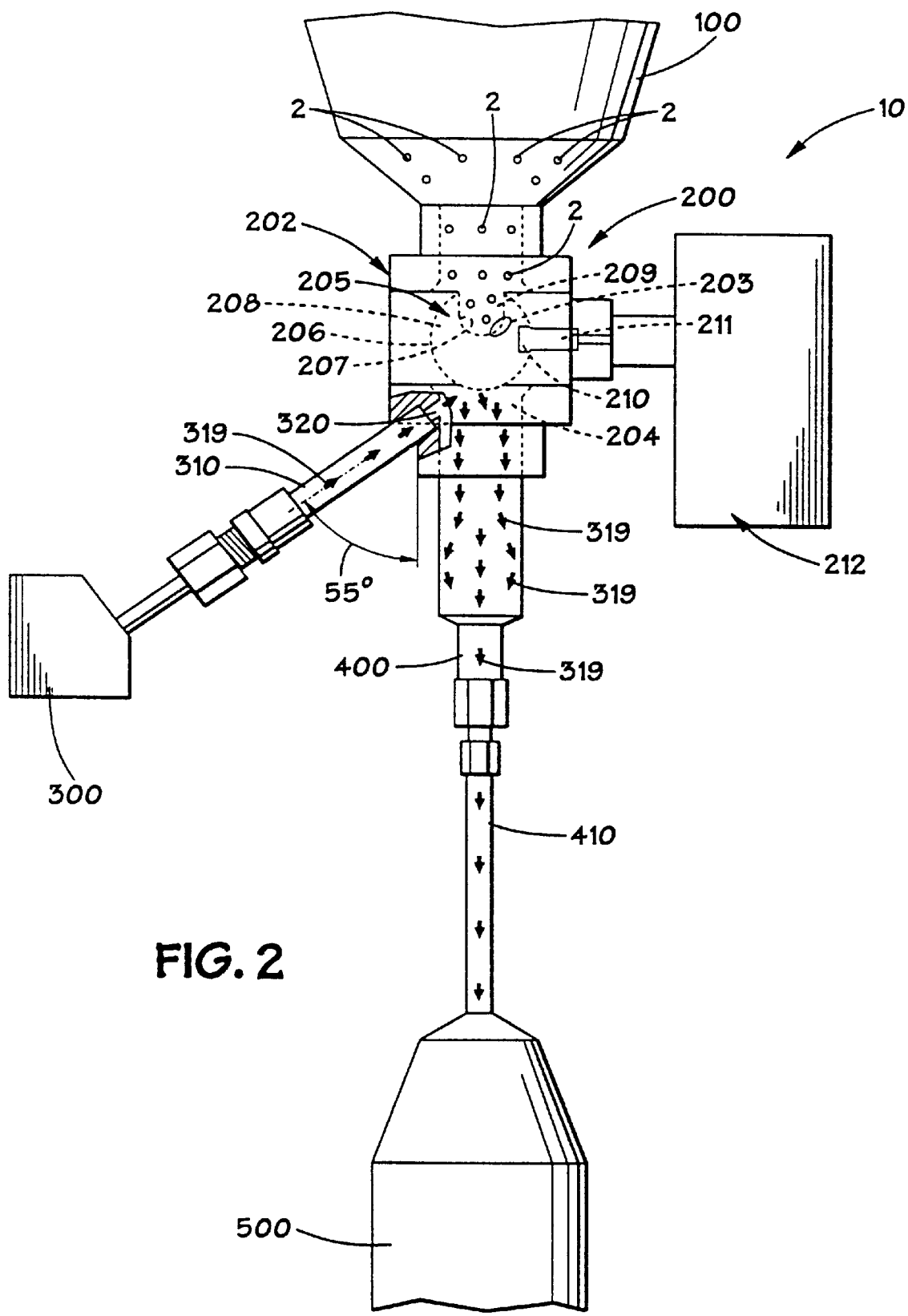
FIG. 2 is a partial cross-sectional view of an embodiment of an injection system of the present invention, showing a metering device having a spherical rotor disposed in a first, or filling, position.
Figure 3:
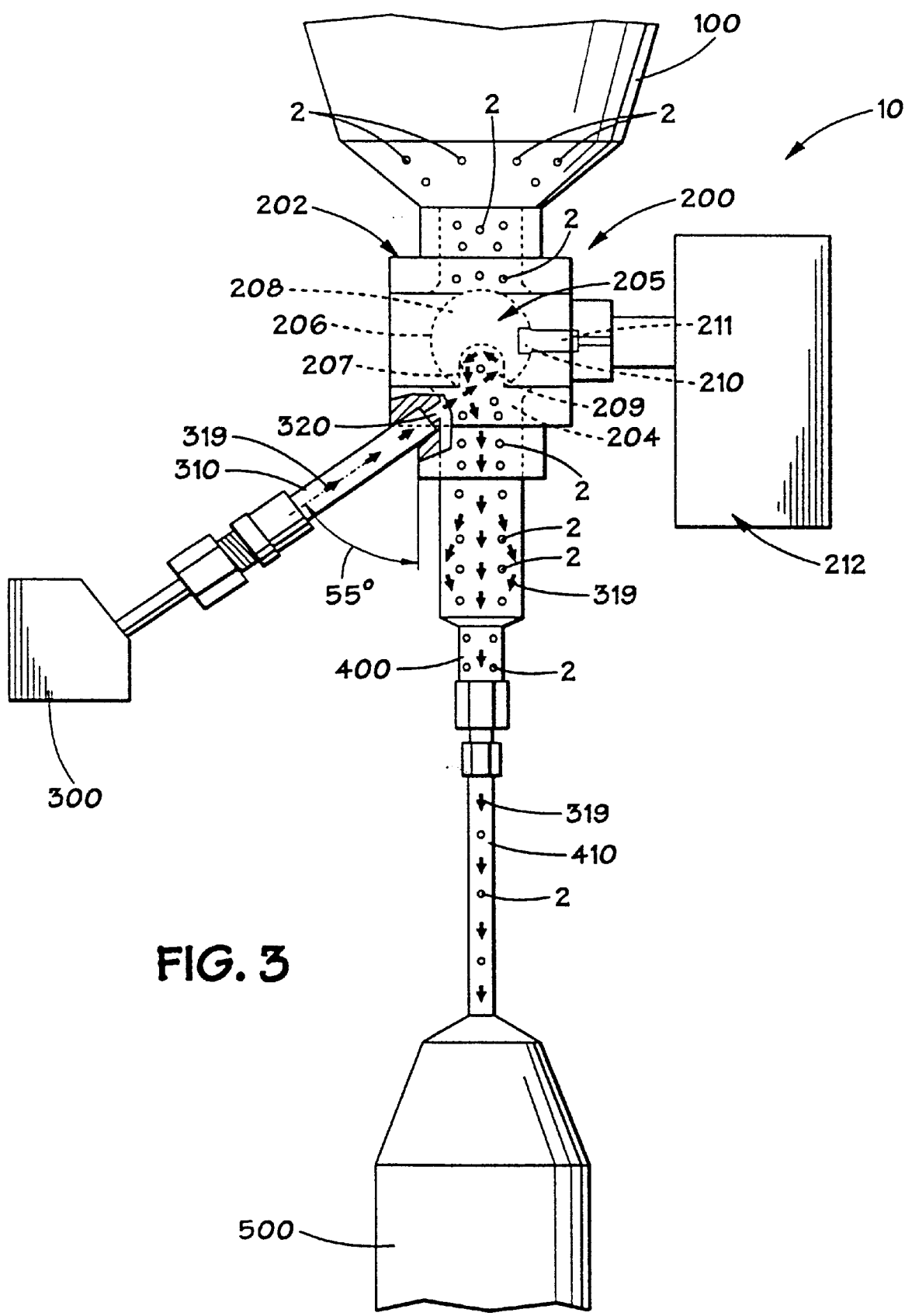
FIG. 3 is a partial cross-sectional view of an embodiment of an injection system of the present invention, showing a metering device having a spherical rotor disposed in a second, or releasing, position.
Figure 4:
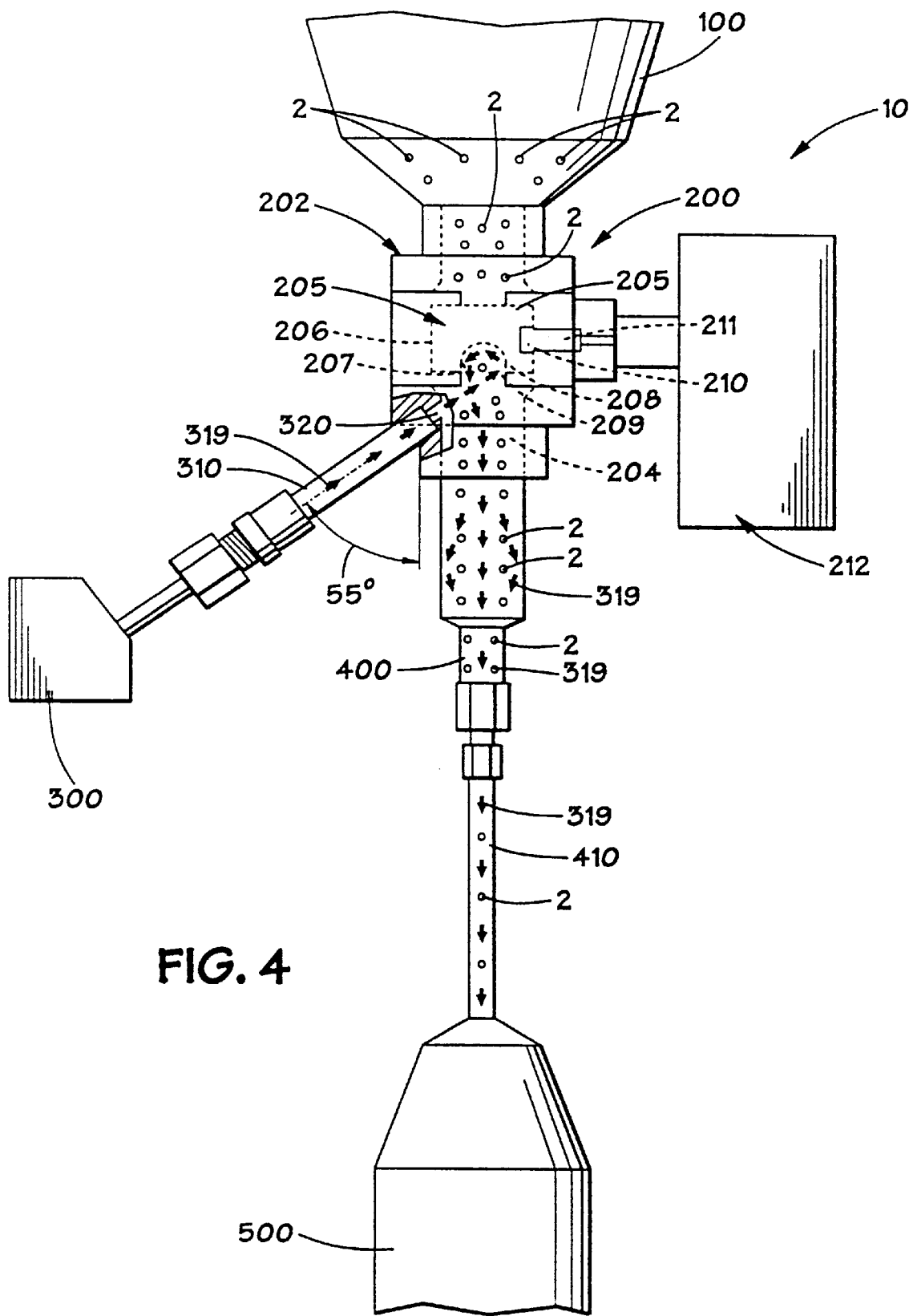
FIG. 4 is a partial cross-sectional view of the injection system of FIG. 2, showing the metering device having a cylindrical rotor.

FIG. 1 shows in schematic form an embodiment of the present injection system 10 for feeding particulate, such as a catalyst, to a process vessel, or reactor 500, which may be used in the processing or manufacturing of polyethylene, for example. The injection system may include a particulate storage vessel 100, which may be used to store excess amounts of the particulate 2 to be fed to the reactor 500; a metering device 200, comprising a rotary valve 205 (FIGS. 2–4), which may be a standard cylindrical or spherical ball valve 205 known in the art that has been modified as described further hereinbelow; an intermediate chamber 400 in which measured doses of particulate 2 may be initially deposited prior to being transported by, for example, the force of gravity to the reactor 500. Sweep stream source 300 may be provided and disposed in fluid communication with sweep chamber 204 (FIGS. 2–4) and the intermediate chamber 400 by use of conduit 310 disposed in fluid communication with sweep stream port 320, which is provided in fluid communication with sweep chamber 204 (FIGS. 2–4) and intermediate chamber 400. The sweep chamber 204 may be utilized as the intermediate chamber 400 or a separate sweep chamber 204 and intermediate chamber 400 may be used, as shown in FIGS. 2–4. Sweep stream port 320 may preferably be configured to direct the flow of the sweep stream, represented by solid arrows 319 (FIGS. 2–4), toward the metering device 200 to assist in releasing the particulate 2 from cavity 209 (FIGS. 2–4) formed in metering device 200, as hereinafter described. As described more fully hereinbelow, in operation, metering device 200 will oscillate, or reciprocate, between a first position (FIG. 2) for filling the metering device with a measured dosage of particulate 2 from the volume of particulate 2 stored in the particulate storage vessel 100 and a second position (FIG. 3) for releasing the measured dosage of particulate 2 into the sweep chamber 204 or intermediate chamber 400.

While the metering device 200 is in the second position (FIG. 3), the pressurized sweep stream, provided by the sweep stream source 300 through sweep stream port 320 into the sweep chamber 204 or intermediate chamber 400, is directed toward the metering device 200 to facilitate removal of particulate 2 from the metering device 200. The sweep stream may be any material suitable for use as a sweep stream, but is preferably an inert gas such as nitrogen, which may be pressurized at a relatively high pressure to ensure efficient and complete removal of the particulate 2 from within cavity 209, and may be: directed in the general direction of the cavity 209; directed directly toward the cavity 209; or directed at an appropriate angle toward an appropriate surface 207 of cavity 209.

Figure 5:
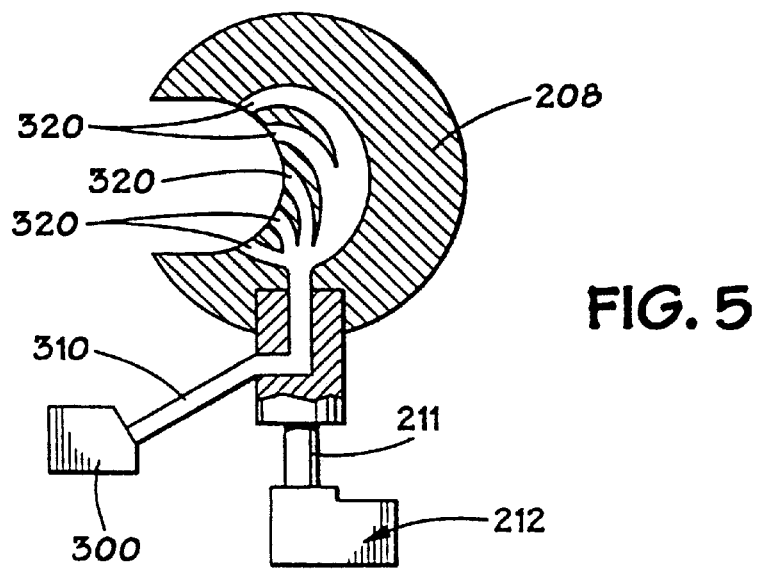
FIG. 5 is a partial cross-sectional view of an alternate embodiment of a rotor of the present invention, showing a sweep port comprised of multiple apertures formed in the surface of the rotor proximate the cavity formed therein.

Cavity 209 of rotor 208 may include an arcuate portion such as arcuate portion 203 shown in FIG. 2 or cavity 209 of rotor 208 may have an entirely arcuate shape, as shown in FIG. 5, to facilitate efficient removal of particulate 2 from within cavity 209. The arcuate shape of cavity 209 and the flushing action of the sweep stream facilitate efficient removal of particulate 2 from within cavity 209. The sweep stream may be provided in a continuous flow or it may be provided in intermittent bursts timed by suitable control means known in the art to efficiently remove particulate 2 from cavity 209. In the process of removing particulate 2 from cavity 209, the sweep stream may dilute and dissolve particulate 2 to prevent concentrated clumps or "slugs" of catalyst being transported through the intermediate chamber 400 into the reactor 500, thus avoiding fouling of the reactor 500. The particulate 2 may then be transported through the intermediate chamber 400 by gravity or other forces into the reactor 500. In addition to facilitating removal of particulate 2 from cavity 209, the sweep stream may also assist in transporting particulate 2 through reactor conduit 410 to reactor 500.

Referring now to FIG. 2, a metering device 200 of the injection system 10 of the present invention is shown in the first, or filling, position. Metering device 200 may preferably include a rotor housing 202 having a sweep chamber 204 and a rotor receiving chamber 206 therein. The rotor 208 may be rotatably disposed within the rotor receiving chamber 206 of the rotor housing 202 and may have a cavity 209 formed therein, which preferably may be cup-shaped or bowl-shaped, having an arcuate portion 203. Those skilled in the art will recognize that various shapes and sizes of the various components could be selected depending upon the characteristics of the particular particulate 2 being used, the desired injection rate, and other factors in a given application, including the size of the surrounding catalyst injection system components, the velocity and characteristics of the sweep stream material, and the amount of time that the metering device spends in each position. Although the preferred embodiment may be described in connection with a spherical rotor 208, comprising a modified ball valve having a cavity therein, the rotor design is not limited to a spherical rotor and may also be a cylindrical rotor 208, as shown in FIG. 4. In addition, the rotor design of the present invention is not limited to having a single cavity 209 or to a cavity 209 of any particular size or shape; however, in a preferred embodiment, the rotor 208 preferably has one cavity 209, having a relatively large opening and a relatively shallow depth and is partially or completely arcuate.

Still with reference to FIG. 2, the metering device 200 of the injection system 10 of the present invention is shown rotatably disposed within the rotor receiving chamber 206 of the rotor housing 202. The rotor 208 is shown having at least one generally cup-shaped cavity 209 portion formed therein that is shaped and sized to receive a predetermined volume of particulate 2. The rotor 208 is shown in its first position for receiving the predetermined volume of particulate 2 stored in the particulate storage vessel 100. The rotor 208 further includes a drive keyway 210 formed therein for receiving the shaft 200 of a drive mechanism, or actuator 212, that is disposed in operative engagement therewith for rotating the rotor 208 between the first position of FIG. 2 and a second position as shown in FIG. 3. In a preferred embodiment, the rotor 208 of metering device 200 may be a ball valve 205 of the type identified in the art as a Whitey ½" S60P ball valve having a 180° actuator, the valve 205 having been modified by discarding its standard ball and replacing the ball with a spherical rotor having a cavity 209, as shown in FIGS. 2–3.

Now with reference to FIG. 3, the metering device 200 of the injection system 10 of the present invention is shown in its second position for releasing the predetermined volume of particulate 2 stored in cavity 209 of the rotor into the sweep chamber 204, or intermediate chamber 400, for transport to the reactor 500 by gravity, or other motive force, which may be assisted by the sweep stream represented by solid arrows 319. Sweep stream port 320 is shown disposed through the rotor housing 202 directed at the cavity 209 in the rotor 208. The sweep stream represented by solid arrows 319 is provided by sweep stream source 300 through sweep stream conduit 310 and enters rotor housing 202 in a direction generally toward rotor 208. It should be apparent to those skilled in the art that other methods of directing the sweep stream toward rotor 208 can be utilized. Accordingly, the injection system 10 of the present invention is not to be limited to a sweep port 320 provided in the rotor housing 202, but should include other embodiments apparent to those skilled in the art for directing the sweep stream toward the rotor 208. For example, the sweep stream may be directed toward the rotor 208 by means of a hose provided within reactor conduit 410 and running along the interior of reactor conduit 410 having an end disposed proximate rotor 208. In addition, as shown in FIG. 5, metering device 200 may include a port formed within rotor 208 that may apply a sweep stream from apertures formed in the surface of the cavity to further eject particulate from within the cavity. The aperture would then be in fluid communication with the sweep stream source by way of a conduit disposed through the shaft of the actuator. Single or multiple sweep streams may also be used in a particular embodiment.

Now with reference to FIGS. 2 and 3, in operation of a particular embodiment, rotor 208 is directed upwards in the first, or receiving, position (FIG. 2) to allow gravity filling of particulate 2 from particulate storage vessel 100. Shaft 211 of actuator 212, disposed in engagement with drive keyway 210 then rotates 180°, causing rotor 208 to also rotate 180° to the second, or releasing, position (FIG. 3) where the particulate 2 is allowed to fall out of cavity 209 formed in rotor 208 by gravity. The sweep stream represented by solid arrows 319, directed towards cavity 209 formed in rotor 208, flushes any additional particulate 2 that would otherwise remain in the cavity 209 formed in rotor 208 after rotating rotor 208 180°. In addition to sweeping the particulate 2 from the cavity 209 of rotor 208, the sweep stream also facilitates transfer of the particulate 2 from the sweep chamber 204 or intermediate chamber 400 to the destination vessel, or reactor 500. Actuator 212 then rotates rotor 208 again 180° and the process repeats to provide a consistent and accurate feed of catalyst or other particulate 2 to the reactor 500 over an extended period of time.

It is to be understood that the invention is not limited to the exact details of construction, operation, exact materials, or embodiments shown and described, as obvious modifications and equivalents will be apparent to one skilled in the art. For example, actuator 212 may reciprocate between 180° from the first to the second position and back or it may continually rotate through the first and second positions, depending on the actuator type used. In addition, the first and second positions of the rotor may be separated by an angle less than 180° such as, for example, where the cavity and rotor housing may be adapted so that the gravity feeding of the particulate is assisted by or replaced with some external force and/or where the stream sweep stream alone or some other force other than gravity assists in the removal of particulate from the cavity of the rotor. In addition, even where gravity and the sweep stream alone facilitate removal of the particulate from the cavity of the rotor, a particular configuration of the cavity, and rotor, and rotor housing could be used so that an angle less than 180° would separate the first and second positions.

Accordingly, the invention is therefore to be limited only by the scope of the appended claims.

What is claimed is:

1. A method of diluting and dispersing a particulate in a carrier gas stream in a process vessel, comprising the steps of:

providing a metering device disposed between a particulate storage vessel and a sweep chamber, the metering device having a rotor with a cavity formed therein;

providing a sweep stream directed generally toward the rotor;

rotating the rotor to a first position for receiving a predetermined volume of particulate stored in the particulate storage vessel; and rotating the rotor to a second position for releasing the predetermined volume of particulate to the sweep chamber, whereby the sweep stream will remove substantially all of the particulate material from the cavity formed in the rotor when the rotor is in the second position and whereby the particulate material removed from the cavity by the sweep stream of carrier gas is diluted by and dispersed in the carrier gas so that the carrier gas is substantially free of concentrated clumps of the particulate material.

2. A method of injecting particulate into a process vessel, comprising the steps of:

providing a metering device disposed between a particulate storage vessel and a sweep chamber, the metering device having a rotor with a cavity formed therein;

providing a sweep stream of carrier gas directed generally toward the rotor;

rotating the rotor to a first position for receiving a predetermined volume of particulate stored in the particulate storage vessel; and rotating the rotor to a second position for releasing the predetermined volume of particulate to the sweep chamber, whereby the sweep stream will remove substantially all of the particulate material from the cavity formed in the rotor when the rotor is in the second position and whereby the particulate material removed from the cavity by the sweep stream of carrier gas is diluted by and dispersed in the carrier gas so that the carrier gas is substantially free of concentrated clumps of the particulate material.

\* \* \* \* \*